US006665631B2

(12) United States Patent
Steinbrecher

(10) Patent No.: US 6,665,631 B2
(45) Date of Patent: Dec. 16, 2003

(54) SYSTEM AND METHOD FOR MEASURING SHORT DISTANCES

(75) Inventor: Donald H. Steinbrecher, Brookline, MA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 5 days.

(21) Appl. No.: 09/965,252

(22) Filed: Sep. 27, 2001

(65) Prior Publication Data

US 2003/0061002 A1 Mar. 27, 2003

(51) Int. Cl.[7] ................................. G01B 5/02
(52) U.S. Cl. ...................... 702/159; 702/150; 702/158; 701/301; 342/455; 342/357.01
(58) Field of Search ....................... 702/159, 158, 702/150; 701/301, 207, 214, 27, 98, 14, 302; 342/378, 372, 455, 25, 357.01, 450, 357.06; 370/466, 396; 324/636

(56) References Cited

U.S. PATENT DOCUMENTS

| 5,181,027 A | 1/1993 | Shafer |
| 5,347,546 A | 9/1994 | Abadi |
| 5,381,338 A | 1/1995 | Wysocki |
| 5,493,309 A | 2/1996 | Bjornholt |
| 5,596,332 A | 1/1997 | Coles |
| 5,798,983 A | 8/1998 | Kuhn |
| 5,872,526 A | 2/1999 | Tognazzini |
| 5,933,099 A | 8/1999 | Mahon |
| 5,983,161 A | 11/1999 | Lemelson |
| 6,021,364 A | 2/2000 | Berliner |
| 6,104,671 A | 8/2000 | Hoyt |
| 6,160,493 A | 12/2000 | Smith |

OTHER PUBLICATIONS

Information Disclosure Statement Pursuant to 37 CFR § 1.97b executed by Attorney of Record Michael F. Oglo on Nov. 19, 2002, filed as an earlier paper in the above-referenced patent appliation, with a PTO indicated filing date of Jan. 17, 2002, but which on page 1 thereof has 37 CFR § 1.8 mailing certificate which indicates a filing date of Nov. 19, 2001, and which is hereby incorporated by reference into the submissions accompanying this form 1449.
Declaration executed by the Applicant, Donald H. Steinbrecher on Feb. 3, 2003

Primary Examiner—John Barlow
Assistant Examiner—Hien Vo
(74) Attorney, Agent, or Firm—James M. Kasischke; Michael F. Oglo; Jean-Paul A. Nasser

(57) ABSTRACT

A system and method are provided to measure relatively short distances between one or more moveable objects and with respect to an environment. The transponders may be affixed to other moveable objects and/or may be affixed in position within the environment. The transponders detect the query signal and respond with an acoustic response signal. A synchronized clock system establishes common timing between the transponders and the moveable objects such that the start time at which the acoustic response signal is sent is known. The moveable object detects a receipt time when the acoustic response signal is received. Knowing the start time and the receipt time, a transit time for the acoustic signal can be determined whereby a separation vector may be calculated. The system may be used to determine and transmit a table that contains the relative positions of all moveable objects in the environment.

20 Claims, 3 Drawing Sheets

SYSTEM AND METHOD FOR MEASURING SHORT DISTANCES

STATEMENT OF THE GOVERNMENT INTEREST

The invention described herein may be manufactured and used by or for the Government of the United States of America for Governmental purposes without the payment of any royalties thereon or therefore.

CROSS REFERENCE TO OTHER PATENT APPLICATIONS

Not applicable.

BACKGROUND OF THE INVENTION (1) Field of the Invention

The present invention relates generally to systems and methods for measuring relatively short distances preferably by utilizing a combination of electromagnetic and acoustic signaling. More particularly, the present invention is especially suitable for electronically measuring the distance between a plurality of objects that may be in relative motion or formation with respect to each other and which may be moving at relatively high speeds with respect to other objects in underwater or airborne environments.

(2) Description of the Prior Art

Typical methods of electronically measuring distances between objects may include use of RADAR, LIDAR, or other systems. However, in many cases such moving objects or vehicles may contain various electronic communications equipment with the result being that the electronic systems may frequently interfere and confuse each other when multiple short-range objects are targets are in range.

Future Navy systems may deploy one or more groups of autonomous stealthy objects that may function together to perform one or more needed functions, e.g., a large-aperture electromagnetic collection system or high-bandwidth communications link. The objects and/or groups of objects may be required to move together as a unit within tens of meters while maintaining a predetermined one-to-another positional relationship or formation. When the relative separations among the individual objects are larger, an independent position locating system, e.g., GPS, RADAR, and the like, may be used by the plurality of autonomous vehicles to maintain their relative positions within a specified envelope. However, systems such as GPS and others may often have rather limited accuracy with respect to close distances of ten or twenty meters or less, processing time constraints, reception interference problems, and so forth. It would be desirable to provide a method that can be utilized to determine and/or maintain the relative position of a plurality of objects moving together in a selectable formation whereby the objects may be within a few meters of each other and whereby accuracy of the relative positions of each object may be rapidly and repeatedly calculated with accuracy in the millimeter to centimeter range being easily achievable.

Various inventors have attempted to solve related problems as evidenced by the following patents.

U.S. Pat. No. 6,160,493, issued Dec. 12, 2000, to E. T. Smith, discloses a low-cost and reliable radio warning system 12 that alerts system users to potentially hazardous conditions. The system makes use of a transmitter and at least one receiver. The transmitter generates and transmits a radio warning signal that carries a digital data sequence that includes information concerning a particular potential hazardous condition from which the transmission was initiated, such as an approaching ambulance, fire truck, bus, train, or the like. Other information, such as GPS coordinates, may also be included. Through the use of digital encoding techniques, the system's susceptibility to false alarms or "false triggers" is minimized. The radio warning signal is transmitted in burst transmissions and may use a number of signaling techniques, including spread spectrum transmission, which increases system reliability and performance even in the presence of interference or multipath distortion. System users are equipped with a receiver that receives the radio warning signal and interprets the digital data and information carried by the warning signal. The receiver alerts the system user who has received the radio warning signal of the potential hazardous condition through the use of an audible, visual or tactile alarm. Based on the simplicity of its design, the receiver is intended to be small enough to be a portable, hand held-device, or installed or mounted in a user's motor vehicle so that persons carrying the receiver and motor vehicle operators alike can be alerted of potentially hazardous conditions by receiving a radio warning signal of the present invention.

U.S. Pat. No. 6,104,671, issued Aug. 15, 2000, to Hoyt et al, discloses an apparatus and method for measuring the true distance and relative velocity between first and second objects. The apparatus comprises a transceiver located at the first object which measures a first transit time for the transmission of a first signal from a first object to a second object and for the reflection of the first signal from the second object back to the first object. The transceiver further measures a second transit time for the transmission and reflection of a second signal, the second signal being transmitted immediately upon the reflection of the first signal back to the first object. First and second transit times can be used to calculate first and second apparent distances between the first and second objects, respectively. The apparatus also includes calculating means for determining the relative velocity between the first and second objects using the first transit time and the second transit time. The calculating means calculates the true distance between the first and second objects at the time of reflection of the second signal by modifying the second apparent distance in accordance with the relative velocity between the first and second objects during the time of transmission and reflection of the second signal.

U.S. Pat. No. 5,983,161, issued Nov. 9, 1999, to Lemelson et al., discloses GPS satellite ranging signals received on comm1, and DGPS auxiliary range correction signals and pseudolite carrier phase ambiguity resolution signals from a fixed known earth base station received on comm2, wherein information related to one of a plurality of vehicles/aircraft/automobiles is computer processed to continuously determine the one's kinematic tracking position on a pathway with centimeter accuracy. That GPS-based position is communicated with selected other status information to each other one of the plurality of vehicles, to the one station, and/or to one of a plurality of control centers, and the one vehicle receives therefrom each of the others' status information and kinematic tracking position. Objects are detected from all directions by multiple supplemental mechanisms, e.g., video, radar/lidar, laser and optical scanners. Data and information are computer processed and analyzed in neural networks in the one vehicle to identify, rank, and evaluate collision hazards/objects, an expert operating response to which is determined in a fuzzy logic associative memory which generates control signals which actuate a plurality of control systems of the one vehicle in a coordinated manner to maneuver it laterally and longitudinally to avoid each collision hazard, or, for motor vehicles, when a collision is unavoidable, to minimize injury or damage therefrom. The operator is warned by a heads up display and other modes and may override. An automotive autopilot mode is provided.

U.S. Pat. No. 5,798,983, issued Aug. 25, 1998, to Kuhn et al., discloses a multi-lane traffic monitoring system based on detecting the acoustic signals motor vehicles create and radiate during operation. The system comprises an array of electro-acoustic sensors for converting impinging acoustic wavefronts to analog electrical signals; a circuit to acquire, perform signal frequency component discrimination, and digitize the electrical signals at the electro-acoustic sensor array output; a circuit to perform effective spatial discrimination in the up/down road direction and in the cross-road direction in real time; a circuit to perform vehicle detection for individual lanes and to estimate or measure pertinent parameters associated with each vehicle detection from each traveled lane; and a circuit to compute for each lane, pertinent traffic flow parameters from vehicle parameters for the purpose of providing a transportation system interface. In accordance with another embodiment, a circuit is provided to automatically scan for acoustic sources in the cross-road direction and to automatically identify each highway lane direction relative to it the physical electro-acoustic sensor array orientation. In accordance with still another embodiment, a circuit is provided via signal frequency component discrimination and signal processing to create, from a single physical sensor, two vehicle detection zones within each highway lane, wherein a smaller detection zone is located inside a larger detection zone. A circuit is also provided to measure the time between initial vehicle detection in the larger (outer) detection zone and initial vehicle detection in the smaller (inner) detection zone, wherein vehicle speed is determined from the initial detection time difference. In accordance with yet another embodiment, a circuit is provided to measure the relative position of the sound radiated from each of a vehicle's tires and determine vehicle type classification associated with each vehicle detection and with each measured vehicle speed.

U.S. Pat. No. 6,021,364, issued Feb. 1, 2000, to Berliner et al., discloses a method and apparatus for acoustically monitoring a highway which is inexpensive to maintain and install and which does not require that the roadway be closed, torn-up or repaved. These results are obtained in an illustrative embodiment of the present invention which comprises a Mill's Cross acoustic array mounted proximate to a highway, spatial discrimination circuitry, frequency discrimination circuitry and interface circuitry that generates a binary signal which indicates when a motor vehicle is, or is not, within a detection zone on the roadway.

U.S. Pat. No. 5,933,099, issued Aug. 3, 1999, to J. Mahon, discloses a collision avoidance system for a warning aircraft which includes a transmitter and receiver for interrogating the transponder of a warned aircraft. A computer to be installed in the warning aircraft is programmed with the distances or rates of closure at which the warning aircraft and the warned aircraft constitute traffic for one another. When the computer has determined that the warning aircraft and a warned aircraft constitute traffic for one another, a warning system broadcast an appropriate vocal warning.

U.S. Pat. No. 5,872,526, issued Feb. 16, 1999, to B. Tognazzini, discloses a collision avoidance system for a plurality of vehicles equipped with GPS receivers, each broadcasting current location information to other vehicles and receiving and displaying location information from other vehicles, which enables a vehicle operator to be aware of the location of the other vehicles. For vehicles not equipped with GPS, and transceivers, information about location is taken from common ground control equipment such as a FAA control station and broadcast to all vehicles. In an aircraft environment, flight plans can be filed and closed out automatically.

U.S. Pat. No. 5,493,309, issued Feb. 20, 1996, to J. E. Bjornholt, discloses a collision avoidance communication system and method with equipped aircraft and ground control stations that represent nodes of a RF communication network. A radar system determines locations of equipped aircraft and unequipped aircraft within an airspace. The ground control station couples to the radar system and the network to receive location data for the aircraft. These location data are merged in an object list. The ground control station displays objects from the object list, broadcasts surrogate location data for unequipped aircraft over the network, and broadcasts control data describing weather conditions, geographic features, and the like, over the network. Equipped aircraft receive aircraft location data and control data from the network. Each equipped aircraft determines its own location. The equipped aircraft include a display which shows the locations and orientations of nearby aircraft and of geographic features, and the equipped aircraft broadcast their own locations over the network.

U.S. Pat. No. 5,596,332, issued Jan. 21, 1997, to Coles et al., discloses an aircraft location and identification system including a first position determining portion located aboard a transmitting aircraft for determining a first set of present positional and tracking information is described relative to said transmitting aircraft. A transmitting portion is included for transmitting the first set of present positional and tracking information to a receiving aircraft. A second position determining portion, which is located aboard the receiving aircraft, determines a second set of present positional and tracking information relating to the receiving aircraft. A computing portion is located aboard the receiving aircraft and/or a ground based facility. The computing portion utilizes present and past values of the first set of present positional and tracking information to derive a corresponding first probabilistic future tracking configuration of the transmitting aircraft. The computing portion also utilizes present and past values of the second set of the present positional and tracking information to derive a corresponding second probabilistic future tracking configuration of the receiving aircraft.

U.S. Pat. No. 5,381,338, issued Jan. 10, 1995, to Wysocki, et al., discloses a positioning, navigation and collision avoidance system for ships, aircraft, land vehicles and the like, which utilizes a geo-referenced digital orthophotograph data-base and a positioning signal to display upon a computer stereo graphics device a high visibility dynamic photographic image of the user's immediate environment, including both moving and stationary obstacles. The position and temporal data along with the geo-referenced elevation data utilized to derive the digital orthophotograph(s) can serve to warn the user of nearby obstacles; and optionally, to implement semi-automatic avoidance. Substituting user generated x-y-z positions and times, the system may be used in a static mode as a flight simulator or a simulator for other modes of transportation. The system may also be used as a mobile Geographic Information Systems decision making tool with the addition of user supplied geo-referenced digital data layers.

U.S. Pat. No. 5,347,546, issued Sep. 13, 1994, to Abadi et al., discloses a method and apparatus for pre-filtering a global positioning system receiver, which includes the steps of: receiving a plurality of L-band radio frequency signals having unique modulation and originating in a plurality of global positioning system satellites; splitting the plurality of radio frequency signals into at least a first L1 radio frequency signal and a second L2 radio frequency signal; passing the first L1 radio frequency signal to a first radio frequency receiving section through a L1 signal passage defining a path from a common junction point to the L1 radio frequency receiving section, while simultaneously passing the L2 radio frequency signal to a second radio frequency receiving section through a L2 signal passage defining a path from the common junction point to the L2 radio frequency receiving section; filtering the L1 radio frequency signal from the L2 signal passage and filtering the L2 radio frequency signal from the L1 signal passage, while substantially preserving the L1 radio frequency and the L2 radio frequency signals; and feeding the L1 and the L2 radio frequency signals to the first L1 radio frequency receiving section and the second L2 radio frequency receiving section, for determining position information.

U.S. Pat. No. 5,181,027, issued Jan. 19, 1993, to T. R. Shafer, discloses an improved air traffic control (ATC) system which utilizes traffic alert and collision avoidance systems (TCAS) as a component together with a flight control computer of an aircraft autopilot, a data radio and an interactive touch screen display device to produce a system for allowing easy trailing of another aircraft on trans-oceanic flights and to reduce landing delays at busy airports under IFR conditions.

Consequently, there remains a long felt but unsolved need for improved short distance locating system that may be used for orientation of individual objects and/or one or more groups of objects which may be in tight formation relative to individual objects, targets, and/or other groups, and which move within an environment possibly at high speeds. Those skilled in the art will appreciate the present invention that addresses the above and other problems.

SUMMARY OF THE INVENTION

Accordingly, it is an objective of the present invention to provide an improved system and method for measuring short distances.

Another objective is to provide a system and method as aforesaid which provides a system and method for determining relative distances between one or more objects, and/or one or more groups of objects.

A further objective is to provide a system and method as aforesaid whereby transponders responsive to query signals are provided and whereby acoustic signals may preferably be responsively transmitted by the transponders.

A still further objective is to provide a system and method as aforesaid whereby the query may be provided electromagnetically, acoustically, or by other transmission means.

Yet another objective is to provide a system and method as aforesaid which is of special utility whereby the environment in which the objects move may comprise an underwater environment, airborne environment, underground environment, or other environments.

These and other objectives, features, and advantages of the present invention will become apparent from the drawings, the descriptions given herein, and the appended claims. However, it will be understood that above listed objectives and advantages of the invention are intended only as an aid in understanding aspects of the invention, are not intended to limit the invention in any way, and do not form a comprehensive list of objectives, features, and advantages.

In accordance with the present invention, a short distance measuring system for measuring distances less than 20 meters is provided that is operable within an environment and may comprise elements such as, for instance, a plurality of moveable objects moveable independently of each other within the environment. Each of the plurality of moveable objects may have a transponder mounted thereto operable for receiving a query signal and producing a response signal. The invention may provide a plurality of synchronized clocks. A synchronized clock system is provided to produce synchronized timing signals. In one embodiment, the synchronized clock system provides that each of the plurality of moveable objects have mounted thereto a respective one of a corresponding plurality of synchronized clocks. Each of the synchronized clocks may be operable for producing the synchronized timing signals. The synchronized timing signals may or may not be broadcast to maintain synchronization. Alternatively, broadcast timing signals may be used without the need for multiple clocks. Each of the transponders may be operable for producing a response signal in response to the query signal at a start time based on the synchronized timing signal. A response signal detector may be provided for each of the plurality of moveable objects. The response signal detector is preferably operable to measure a transit time for the response signal beginning at the start time based on the synchronized timing signals and ending upon detection of the response signal at a respective moveable object. The response signal detector may be operable for measuring a magnitude of one or more separation vectors between the plurality of moveable objects utilizing a respective transit time.

In one embodiment, the query signal is an electromagnetic signal and the response signal is an acoustic signal. In another embodiment, the electromagnetic signal comprises a pseudo noise code. The electromagnetic signal may further comprise location information data related to the plurality of moveable objects. Still further basic embodiments are possible, including one in which as in preceding the signal responsively transmitted by the transponders is in the form of an acoustic signal, and the query signal is also an acoustic signal. In yet further alternate embodiments, the query signal could be in the forms of infrared signals, other forms of optical signals, or magnetic pulse signals.

The system may further comprise one or more fixed position transponders which may have a fixed location with respect to the environment such that each of the fixed position transponders may be operable for producing an acoustic signal in response to the query signal.

In operation, a method is provided comprising one or more steps, such as, for instance, providing a plurality of synchronized clocks at a plurality of locations, transmitting at least one electromagnetic query signal from the one or more moveable objects, receiving said transmitted at least one electromagnetic query signal, responding to said transmitted at least one electromagnetic query signal by generating at least one acoustic signal such that said at least one responsively transmitted acoustic signal is transmitted at a start time based on timing of the synchronized clocks, measuring a transit time of said responsively generated at least one acoustic signal to the one or more objects by measuring a time beginning at the start time and ending upon receipt of said responsively transmitted at least one acoustic signal, and determining a distance based on the transit time.

Other steps might include providing one or more transponders moveable within the environment operable for effecting the steps of receiving and transmitting and/or mounting respective of the one or more transponders to respective of the one or more moveable objects and/or mounting one more transponders to be affixed in position with respect to the environment.

The method may further comprise sending transponder identity information from the one or more transponders to identify a respective transponder that produces said responsively transmitted at least one acoustic signal and/or updating location information regarding a location of the one or more moveable objects within the environment and/or transmitting the location information utilizing an electromagnetic signal.

Thus, the present invention provides a short distance measuring system for an environment which may comprise one or more elements such as, for instance, one or more moveable objects moveable within the environment, a transmitter for the one or more moveable objects operable for transmitting location information regarding a position of the one or more moveable objects within the environment and/or operable for transmitting a query signal, one or more transponders operable for producing a response signal in response to the query signal such that the response signal may be detectable by the one or more moveable objects, a plurality of synchronized clocks for the one or more transponders and for the one or more moveable objects so that the response signal is produced at a start time based upon a timing of the plurality of synchronized clocks, a transit-time measurement detector operable to measure a transit time of the response signal beginning at the start time and ending upon detection of the response signal by the one or more objects whereby the transit-time measurement detector may be operable for measuring a magnitude of a separation vector between the one or more moveable objects and the one or more transponders.

The system may further comprise a control system for maintaining a desired magnitude of the separation vector. In one embodiment, the control system is operable for automatically maintaining a desired formation of a plurality moveable objects by monitoring a plurality of corresponding of separation vectors. In a further embodiment, the system may comprise an information system for an operator or visitor desirous of determining his/her way in navigating through a complex environment, such as a large building complex. In this system, the moveable object transmitting a query signal may be a handheld, portable, battery-operated device which co-acts with acoustic transponders fixedly mounted within the environment.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout several views of the drawings and wherein.

BRIEF DESCRIPTION OF THE PREFERRED EMBODIMENTS

Figure 1:
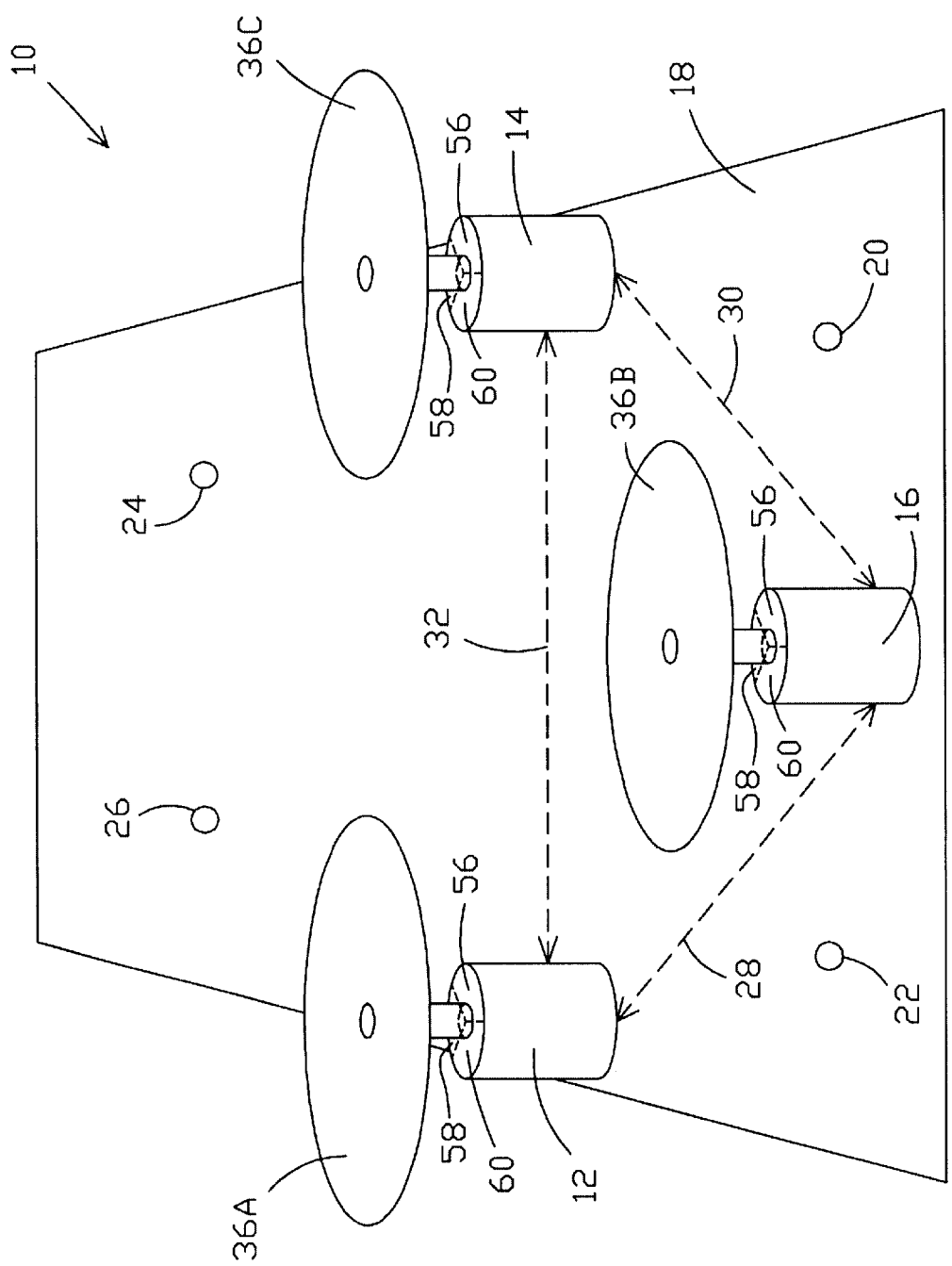
FIG. 1 is partially a schematic and partially a diagrammatic depiction, which discloses short distances measurable in accord with the present invention relative to one or more objects or groups of objects and/or an environment.

Referring now to FIG. 1, in accord with the present invention, there is shown system 10 illustrated with three moveable objects or groups of moveable objects 12, 14, and 16 disposed within environment 18. System 10 may comprise any number N of moveable objects, or groups of objects, and/or transponders. As well, each moveable object or group of objects 12, 14, and 16 could in itself also represent one or more groups of objects.

As used herein, transponders are devices that when queried by a signal, responsively transmit a signal. Objects 12, 14, and 16 may preferably have transponders mounted thereon or thereto so as to be integral therewith. Objects or groups of objects 12, 14, and 16 are moveable with respect to each other and with respect to environment 18. System 10 may, depending on the system configuration and overall purpose, also comprise fixed position transponders 20, 22, 24, and 26. Fixed position transponders 20, 22, 24, and 26 may be any number N of transponders that are fixed with respect to environment 18 and preferably located at a known location within environment 18. The fixed position of the fixed transducers may preferably be stored in system 10 memories.

Environment 18 may comprise any medium although a presently preferred medium supports transmission of acoustic signals such as air, water, earth, and/or other matter or combinations thereof. Environment 18 may effectively be a two-dimensional environment where the objects are constrained to two-dimensional movements such as along a surface, as might be the case for land vehicles or boats. Alternatively, environment 18 may be a three-dimensional environment wherein the objects may move in three dimensions and may comprise, for example, airplanes or underwater vehicles. Thus, the objects in question may comprise airplanes, rockets, unmanned undersea vehicles, submarines, boats, drilling devices, r.f. transmitter/acoustic receiver apparatus in the form of a hand-held battery-operated unit, and the like.

Each object 12, 14, and 16 may comprise a plurality of objects that may be in a formation or physical pattern with respect to other objects just as elements 12, 14, and 16 may be in a particular pattern with respect to each other. Thus, for example, object 12 may actually comprise a plurality of airplanes or underwater vehicles moving together in a formation. Separation vectors such as vectors 28, 30, and 32, which may have a magnitude and a direction, may define a particular pattern or formation of the moveable objects.

Figure 2:
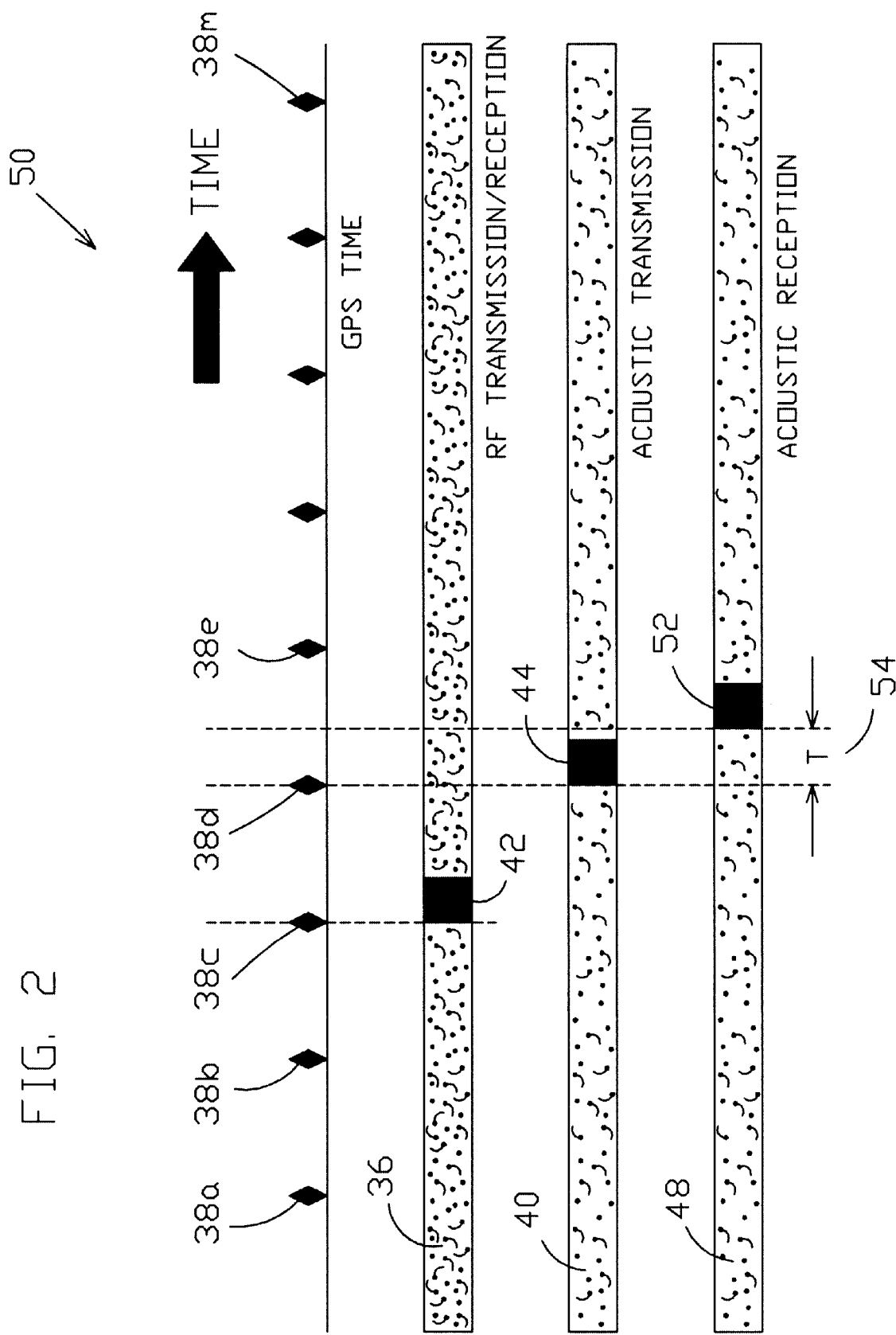
FIG. 2 is a timing diagram in accord with one possible embodiment of the invention.

For the purpose of illustration, assume that object 12 is programmed or operable to interrogate objects 14 and 16 or transponders mounted thereon as to parameters related to vectors 28 and 32 such as the magnitude and/or direction thereof. FIG. 2 provides a timing diagram of signals that describe one possible timing method for determining a magnitude of separation vectors 28 and 32. However, the end results could also be obtained utilizing different timing means than those shown in FIG. 2.

In one presently preferred embodiment, to perform a measurement of the magnitude of separation vectors 28 and 32, object 12 sends a query such as query 42, which is shown as originating at a particular timing mark 34 in timing diagram 50. Sending the query signal may take the form of embedding it in a continuing r.f. transmission. In this embodiment, timing mark 34 is synchronized with other clocks by transmitting timing signals in RF transmission 36, which may utilize GPS timing signals. In the timing diagram of FIG. 2, timing synchronization is provided between objects 12, 14, and 16 and/or other objects so that the objects have synchronized clocks. The clocks can be stabilized with GPS time signals or by any other method such as local senders or any other timing synchronization means. In some cases, the clocks may be synchronized before beginning an operation and have sufficient accuracy such that further transmission of timing signals is unnecessary.

While timing diagram 50 illustrates use of an electromagnetic query transmission such as a RF transmission 36, other types of signals such as acoustic signals could also be utilized to make the query. Further examples of other possible types of signals include laser generated infrared signals, other laser generated optical signals, LED generated optical signals, other light signals, and magnetic pulses. Moreover, so long as the objects have synchronized clocks, the query may be sent at any time as discussed hereinafter because the timing of the transponder response signal can be programmed to be produced at a known time subsequent to the query signal.

In the present example, objects 12, 14, and 16 are preferably each transmitting an omni-directional, low-level, pseudo-random, noise-like electromagnetic signal 36 as illustrated in timing diagram 50 of FIG. 2 and diagrammatically shown as being broadcast as signals 36A, 36B, or 36C, FIG. 1. This transmission may be continuous, pulsed, or the like and may also be utilized to verify timing synchronization such as re-broadcasting of synchronization timing signals 38a, 38b, . . . , 38m. This transmission may include identification information, tables that give locations of all concerned objects to all or selected of the other objects or transducers, and any other desired information. Depending on system 10 configuration, all objects may be broadcasting simultaneously with different pseudo-random codes and/or only some objects may be broadcasting and/or only one object may broadcasting, as desired.

In this example, object 12 transmits query signal 42. Upon receipt and detection of query signal 42 by objects 14 and 16, objects 14 and 16 are programmed or hardwired or otherwise designed to produce a responsive locating signal 44. Thus, objects 14 and 16 are monitoring electromagnetic signal 36A produced by object 12. As discussed above, at a selected time signal 36A includes query signal 42. An electromagnetic query signal 42 travels at the speed of light, and objects 12, 14 and 16 are in close proximity, so that there is no appreciable time delay associated with signal 42's propagation between the objects. On the other hand, an acoustic response signal 44 travels at the speed of sound and the duration of time delay, T, associated with its propagation between the objects may be measured. In FIG. 2, in addition to this time delay being assigned the symbol T, it is identified by reference character 54. In this embodiment, object 12 is designed to produce query signal 42 synchronous with timing signals 38. As shown in the timing diagram of FIG. 2, query signal 42 is produced at a time synchronous with a particular timing mark 38c. However, object 12 could also be designed to transmit an asynchronous query signal (not transmitted at a timing mark) so long the response from objects 14 and 16 was transmitted at a known time, e.g., any subsequent timing signal 38 such as, for example, the first or second timing mark after the query signal is received. Alternatively, the response could be sent with a timing having a known delay after a timing mark. The timing signals may be produced simultaneously by a plurality of synchronized clocks. The timing signals may be produced by a single clock on one object, or one fixed transponder, or by a separate transmitter in the environment, or be produced by a few clocks. The timing signals may be broadcast for use by objects or detectors in the system without the need for duplicate clocks. In other words, a synchronized clock system is provided to produce timing signals. The synchronized clock system can be designed in many ways and has the job of providing synchronized timing signals to any element in system 10 that requires synchronized timing signals.

Effectively, response signal 44 is sent at start time 38d. Start time 38d is determinable based on timing signals from each synchronous clock such that object 12 or any other objects or transponders involved will be able to determine the exact start time at which response signal 44 was transmitted.

In response to query signal 42, objects 14 and 16 preferably transmits an omni-directional, low-level, pseudo-random, noise-like acoustic signal (in this embodiment) such as signal 40 containing response signal 44 that is monitored by object 12. In this example, response signal 44 is generated at a known time such as the next timing signal 38d after receipt of query signal 42.

Since objects 14 and 16 each utilize different pseudo random codes, the signals are easily distinguishable by object 12. Many other signal distinguishing means such as filters, codes, frequencies, signal types, and the like could also be used to distinguish the signals from object 14 and 16 such that object 12 can calculate the magnitude of separation vectors 28 and 32. In this example, the coded response 44 from objects 14 and 16 is detected by object 12. Thus, detected acoustic reception signal 48 includes detected response signal 52. Since the start time or moment of generation of response signal 52 is known, predetermined, or programmed to be timing mark 46, object 12 may simply measure the transit time from timing mark 46 to receipt of detected response signal 52 to thereby measure acoustic signal propagation time 54. Knowing the speed of sound in the medium of interest, the magnitude of separation vectors 28 and 32 can be determined. If the speed of sound should vary due to variations in the medium, e.g., temperature or salinity variations, then acoustic speed measurement means, such as a transmitter/receiver mounted on object 12 (not shown), could be provided to provide a continuous measurement of the speed of an acoustic signal in the medium of interest to thereby provide greater accuracy, if desired.

It will be understood that if object 12 wishes to orient itself within environment 18, then object 12 can also query fixed position responders 20, 22, 24, or 26 as discussed above to determine the separation therefrom and determine a precise location with respect to environment 18. Such location information might then be selectively transmitted to objects 14 and 16, if desired, or in response to a request for such information by objects 14 and 16. As an example, see FIG. 3, which is discussed hereinafter.

In one embodiment of the invention, system 10 is provided with a radio transmitter on a first object, such as object 12, that sends an omni-directional query, which may contain identity information embedded in the radio transmission and/or other location information therein. Thus, the signal from object 12 may also identify the signal as originating from object 12. The signal may also contain location information which may comprise rough location information as may be derived from GPS or fixed position transponders 20, 22, 24, and 26. Each cooperating second object within the field of view of object 12, such as moveable objects 14 and 16, or fixed position transponders 20, 22, 24, and 26 may detect query signal 42. Each second object may respond, preferably with a coded acoustic signal that is received by the first object, such as object 12.

As an example of the accuracy of the timing, assume that a first and second object are in the air and located at a separation distance of three meters. The velocity of an acoustic signal in air is approximately 331 meters/second. Thus, the one-way transit time of the acoustic signal from the second object to the first object is about 9 milliseconds. Relatively unsophisticated electronics capable of resolving a time difference of 10 microseconds could provide a measurement accuracy of the magnitude of the separation vector with accuracy on the order of three millimeters. The velocity of electromagnetic signals in air is 300,000,000 meters/second. Therefore, the transit time of the electromagnetic query signal from the first object to the second object can be neglected with no measurable loss of accuracy. The distance between the first object and the second object is thereby very accurately determined by measuring the one-way transit time of the encoded acoustic signal.

One use of the present invention is that of collision avoidance such as between a group of objects moving together or in relationship to each other. Another use is station keeping among a cluster of autonomous entities acting together. Another use is that of locating of an object within an environment.

As one example, consider a theater wherein two or more objects such as airplanes, helicopters, unmanned underwater vehicles, or the like, are required to maintain close proximity within narrow bounds as they move through the environment. Each autonomous object may be required to maintain its own location relative to all other objects in the theater within an envelope having no dimension greater than some specified minimum distance, e.g., one meter. Utilizing the transmission system described hereinbefore, each object is capable of querying all other near-by second objects using an omni-directional, spread spectrum, wide-band, noise-like pseudo random coded RF signal. The RF signal preferably, but not necessarily, identifies the sender. For instance, a different pseudo random code may be used for each object and/or each transponder. In response to a query signal, each nearby second objects responds to each specific first-object query by transmitting an omni-directional wide-band pseudo-random coded acoustic signal containing the identity of the first object, the identity of the second object, and such other information as may be necessary to uniquely identify the second object to the first object and determine its range. In this way, every object in the theater will be able to maintain a table of distances to every other object. These tables preferably define at least the magnitude or the range vectors between a first object and all nearby second objects. The tables may be communicated among the objects using the RF query links such as RF transmission 36 discussed hereinbefore. On board each object, mathematical solutions can be used to determine the relative locations of nearby objects.

The absolute orientation or direction of the separation vector, such as separation vectors 28, 30, 32, or any other separation vectors such as between objects 12, 14, and 16 and fixed position transponders 20, 22, 24, and 26, may also be determined if desired. When only two objects are present, e.g., objects 12 and 14, without fixed position transponders and without any other available information, only the vector magnitude of vector 32 between the objects can be determined without additional information. When only three objects are present without fixed position transponders or any other available information, the instantaneous angle between the separation vectors, such as the angle between separation vectors 28 and 32 can be determined mathematically but the solution will have multiple mirror-image ambiguities. Relative angles can be calculated by taking the objects in groups of three and computing the angles of a triangle when the magnitude of the three sides is known. The trigonometric formula for this is well known. However, the positional relationship among the objects, as determined by this trigonometric method where only three objects are present, will have mirror symmetry about any line defined by two of the objects. As the number of vectors increases, more information about each vector can be computed by calculating each triangle and solving for real solutions.

However for the case of only two or three objects, all of the ambiguities cannot be resolved mathematically if only the separation vector magnitudes are known. Therefore, one method for resolving the mirror-image ambiguities in this case is to use sectored sensors 56, 58, and 60 as indicated in FIG. 1 that are capable of maintaining omni-directional gain while also being capable of resolving the direction. The required accuracy of the direction-of-arrival determination is not very great so only a few sectored sensors would be necessary, in some cases only two or three sectored sensors may be used to distinguish mirror symmetry ambiguities. Another method for resolving the spatial ambiguity would be to use a different system, e.g., a GPS system, to establish an absolute base-line vector among some of the objects. Yet another method, as already implied above, might be to utilize fixed position transponders 20, 22, 24, and 26 whereby the position of each object could be determined in a two-dimensional space with two transponders and in a three-dimensional space with three transponders by determining an intersection of the separation vector magnitudes.

Additional information could also be obtained by using the time derivatives or rates of change of the separation vector magnitudes. Thus, when a cluster of objects such as objects 12, 14, and 16 and/or other objects are moving as a group, then ambiguities relative to the direction of motion can be resolved. For example, a first object can determine the direction of travel of a second object relative to its own direction by observing the speed changes necessary to maintain a constant magnitude separation vector as the first object heading is changed. The first object heading that minimizes the first object velocity while keeping constant the magnitude of the separation vector is the heading of the second object. This assumes that the second object maintains constant heading and velocity while the first object is dithering its course. In this situation, it is also true that the first object velocity is the same as the second object velocity. Thus, it is possible for a first object to follow a second object while maintaining a specified separation if only the magnitude of the separation vector is monitored. The first object dithers its heading to find and maintain the minimum first object velocity solution that keeps constant the magnitude of the separation vector.

Thus, the present invention teaches a system and method that may use omni-directional signals to provide station-keeping information among a plurality of autonomous objects that may be are deployed at short distances (less than a few tens of meters and may typically be less than 15–20 feet) from each other such that normal absolute GPS location techniques are too coarse or too slow to maintain and monitor the required relative separation among the objects. Assume, for example that a plurality of autonomous objects are to be deployed such that the objects maintain themselves in a square grid on three meter centers while moving as a group over a complex surface. If desired, only the first object obtains the information regarding relative location to keep the system more covert. However, without the knowledge of the pseudo codes being utilized, the signals are difficult to detect and appear as white noise to an observer. In another embodiment, system 10 may be utilized as a cruise control system for automatically maintaining one or more objects or groups of objects 12, 14, and 16 in a selectable formation. Thus, if a crew is present, the crew can divert its attention to other matters rather than maintaining the formation. In another embodiment, the particular formation may be selectable from a group of possible formations depending on the environment, the mission of the objects, and so forth. Control computers may be mounted on any or all of objects 12, 14, or 16 and/or externally to objects 12, 14, and 16.

Figure 3:
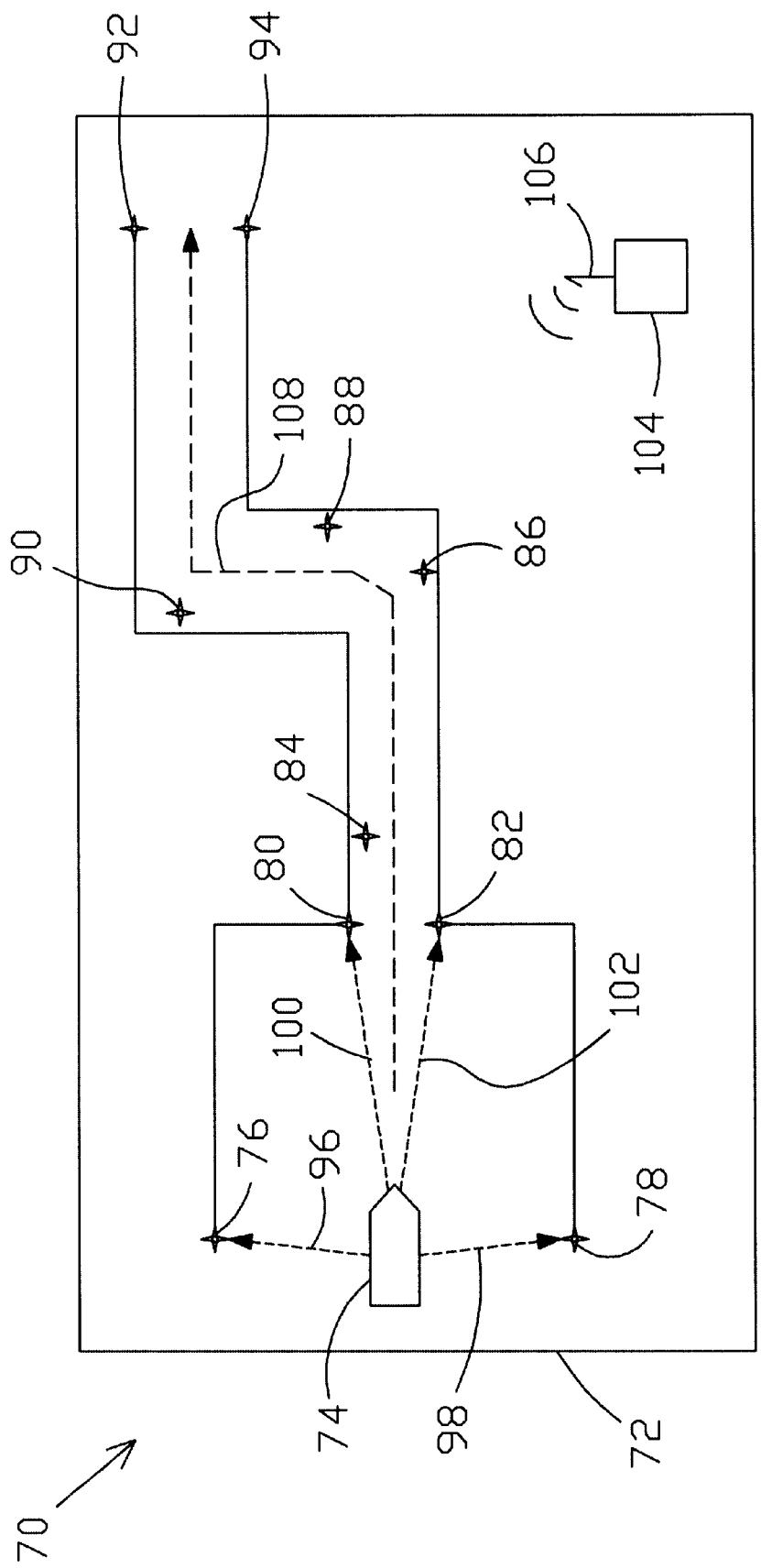
FIG. 3 is partially a schematic and partially a diagrammatic depiction showing a system for projecting and/or navigating a course through an environment in accord with the invention.

FIG. 3 provides another possible embodiment of the invention. In FIG. 3, system or systems 70 may be utilized for navigating through a complex environment such as a building, structure, complex, or other environment 72. For instance environment 72 may comprise a large building complex, tunnel system, multi-level and area parking lot, large store, prison, underground bunker, or the like, and/or any combination of the above or other structures or environments. System 70 enables knowledge of the position of each moveable object, such as object 74, to be constantly updated. Moreover, the location of fixed items, such as fixed transducers, room numbers, location of a car, particular goods being sought such as a particular brand of coffee beans, and/or any other information that may be of use or interest may be transmitted and/or stored in a memory in object 74.

Initially, environment 72 is prepared for navigation and/or position monitoring by mounting within environment 72 a plurality of transponders, such as transponders 76, 78, 80, 82, 84, 86, 88, 90, 92, and 94, which could comprise any number N of transponders. System 70 is provided with a plan or map of environment 72 in memory along with the location and identity of each transponder. Object 74, which could be a hand-held, portable, battery-operated device carried by an operator or visitor who needs to determine his way in environment 72. Alternatively, object 74 could be an autonomous vehicle or robot. As described above, object 74 is operable for producing query signals and receiving response signals from the plurality of transponders. Thus, object 74 may be used for navigating environment 72 by interrogating the sensors in order to determine the relative position of the object 74 in the plan of environment 72. Object 74 may be programmed to update its position at a selected interval rate which is fast enough to permit the user to effectively know at all times, or whenever necessary, his relative position. Object 74 may direct or guide the operator with voice messages, displays, maps, arrows, or the like, as desired. For instance, upon entering a large store and seeking a particular item in the store, the operator may query the machine, which may also be in communication with a larger centralized memory, for the location of the particular item and how to get to the item. As before, object 74 may communicate any desired information either by RF or acoustically to system 70, to transponders, or to other moveable objects. In a presently preferred embodiment, the response signal is an acoustic signal as discussed above. The query signal may be either a RF signal or any suitable signal form of signal, including an acoustic signal, an infrared signal, a laser signal, other forms of optical signals, or a magnetic impulse signal. If desired and/or selected, information about object 74, may or may not be made available to the transponders and/or any other RF receivers. Thus, the system may be set up to share or distribute information in any selectable or programmable manner.

FIG. 3 shows a partial view of confined environment 72, which has ten transponders. The placement of the transponders in this example is such that at any position of object 74 within environment 72, object 74 can query and detect an acoustic response from at least three transponders. In the position shown, object 72 is actually able to query and detect an acoustic response from four transponders, namely transponders 76, 78, 80, and 82. By interrogating the transponders, object 74 and/or other elements of system 70 can determine the magnitudes of the separation vectors 96, 98, 100, and 102. In one embodiment, the identity of the responding transponder would be carried in its return signal so that object 74 and/or other elements of system 70 could locate the origin of the response on a known plan of environment 72. The known plan of environment 72 may be stored in a memory in object 74 and/or in other elements of system 70, e.g., a system computer such as computer 104 with RF receiver/transmitter 106. In this way, the location of object 74 could be determined and decisions could be made for navigating or projecting a desired path 108 to locate a particular goal.

Environment 72 may include many moveable obstacles not illustrated in FIG. 3. In one embodiment of the invention, the navigation plan or path 108 may have been determined and known in advance by elements of system 70 such as object 74, computer 104, and/or any of the transponders. However, other sensors such as door sensors, elevator sensors, ultrasonic sensors, light path sensors, video sensors, and the like could also be part of the system and decisions could be made based upon the sensor system. For instance, if a certain elevator were not functioning, if a door is locked, if a path is blocked in a warehouse, and so forth as determined by the sensors, then another suitable route 108 may be automatically plotted. Thus, the system could be used to navigate around desks in an open area or around moveable pallets in a warehouse. For example, object 74 could be used to control the position of a robot, e.g., for use in removing dangerous radioactive material from a reactor during an emergency or for transporting weapons through a warehouse.

Although one preferred embodiment scenario described herein relates to an electromagnetic query followed by an acoustic response, many other possibilities exist depending on deployment circumstances. In the special case where the surface supporting the objects is water, the query or the response or both could be transmitted acoustically in air or in water or earth, in other fluids, slurries, or combinations thereof. If the transmissions occur on the edges of synchronized timing signals as per the above system, then only the propagation time of the response enters into the distance measurement error. For example, an acoustical form of signal having a much slower velocity of propagation might be used for the query signal without affecting the accuracy of measurement provided by the acoustic signals responsively transmitted by the transponders. Of course, if the clocks are not continuously synchronized, then the possibility of clock synchronization error may also contribute to the distance measurement error. However, in most cases, synchronization error that might arise for a trip that may last less than twenty-four hours will be minimal with selection of suitably accurate clocks.

It will be appreciated by those skilled in the art that the invention can be implemented using a suitable programmed general purpose computer or special purpose hardware, with program routines or logical circuit sets performing as processors. Such routines or logical circuit sets may also be referred to as processors or the like.

Therefore, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A short-distance measuring system operable for measuring short distances in the range of twenty meters or less within an environment, comprising:

a plurality of moveable objects moveable independently of each other within said environment, each of said plurality of moveable objects having a transponder mounted thereto operable for receiving a query signal and producing a response signal;

a synchronized clock system, said synchronized clock system being operable for producing synchronized timing signals to said plurality of moveable objects, each of said transponders being operable for producing said response signal in response to said query signal at a start time based on said synchronized timing signals from said synchronized clock system; and a response signal detector for each of said plurality of moveable objects, said response signal detector being operable to measure a transit time for said response signal beginning at said start time and ending upon detection of said response signal, said response signal detector being operable for measuring a magnitude of a separation vector between a first of said plurality of moveable objects and one or more of said plurality of moveable objects based on said transit time.

2. The system of claim 1 wherein said query signal is an electromagnetic signal and said response signal is an acoustic signal.

3. The system of claim 2 wherein said electromagnetic signal comprises a pseudo noise code.

4. The system of claim 2 wherein said electromagnetic signal comprises location information data related to said plurality of moveable objects.

5. The system of claim 1 wherein said query signal is an acoustic signal and said response signal is an acoustic signal.

6. The system of claim 1 further comprising one or more fixed position transponders having a fixed location with respect to said environment, each of said one or more fixed position transponders being operable for producing an acoustic signal in response to said query signal.

7. A method for measuring short distances in the range of twenty meters or less with respect to one or more moveable objects within an environment, said method comprising:

providing synchronized timing signals to a plurality of locations within said environment;

generating at least one acoustic signal such that said at least one acoustic signal is transmitted at a start time based on said synchronized timing signals;

measuring a transit time of said at least one acoustic signal to said one or more moveable objects by measuring a time beginning at said start time and ending upon receipt of said at least one acoustic signal; and determining a distance to said one or more moveable objects based on said transit time.

8. The method of claim 7 further comprising:

transmitting at least one electromagnetic query signal from said one or more moveable objects;

receiving said at least one electromagnetic query signal; and responding to said at least one electromagnetic query signal by said step of generating said at least one acoustic signal.

9. The method of claim 8 further comprising affixing one or more respective transponders to said one or more moveable objects, said one or more respective transponders being operable for effecting said steps of receiving and responding.

10. The method of claim 8 further comprising affixing one or more transponders with respect to said environment, said one or more transponders being operable for effecting said steps of receiving and responding.

11. The method of claim 8 further comprising providing one or more transponders operable for effecting said steps of receiving and responding, and sending transponder identity information from said one or more transponders to identify a respective transponder that produces said at least one acoustic signal.

12. The method of claim 7 further comprising determining location information of said one or more objects within said environment and updating said location information as said one or more moveable objects move within said environment.

13. The method of claim 12 further comprising transmitting said location information utilizing an electromagnetic signal.

14. A short distance measuring system for an environment, comprising:

one or more moveable objects within said environment;

a transmitter for said one or more moveable objects operable for transmitting location information regarding a position of said one or more moveable objects within said environment;

a synchronized clock system operable for producing timing signals;

an acoustic signal generator operable for producing an acoustic signal at a start time based upon said timing signals of said synchronized clock system; and a transit-time measurement detector, said transit-time measurement detector being operable to measure a transit time of said acoustic signal beginning at said start time and ending upon detection of said acoustic signal by said one or more objects.

15. The system of claim 14 further comprising one or more transponders, said one or more transponders being operable for producing said acoustic signal in response to an electromagnetic query signal, said acoustic signal being detectable by said one or more moveable objects wherein at least one of said one or more transponders are mounted to said one or more moveable objects.

16. The system of claim 14 further comprising one or more transponders, said one or more transponders being operable for producing said acoustic signal in response to an electromagnetic query signal, said acoustic signal being detectable by said one or more moveable objects, said one or more transponders being mounted at fixed positions within said environment.

17. The system of claim 14 wherein said transit-time measurement detector is operable for measuring one or more magnitudes of one or more separation vectors between a plurality of moveable objects, said system further comprising a control system for selectively controlling said one or more magnitudes of said one or more separation vectors between said plurality of moveable objects.

18. The system of claim 17 wherein said control system is operable for automatically maintaining a desired relative orientation of said plurality of moveable objects with respect to each other by monitoring said one or more separation vectors.

19. The system of claim 14 wherein each said transmitter is operable for transmitting a signal utilizing a respective one or more pseudo noise codes.

20. The system of claim 14 wherein said location information comprises a relative location of said one or more moveable objects with respect to said environment.

* * * * *